Aug. 29, 1961 J. S. GASSAWAY 2,998,185
FLUID ACTUATED COMPUTER
Filed Dec. 1, 1955 2 Sheets-Sheet 1

INVENTOR.
JAMES S. GASSAWAY
BY
Bernard Kriegel
ATTORNEY.

Aug. 29, 1961 J. S. GASSAWAY 2,998,185
FLUID ACTUATED COMPUTER
Filed Dec. 1, 1955 2 Sheets-Sheet 2
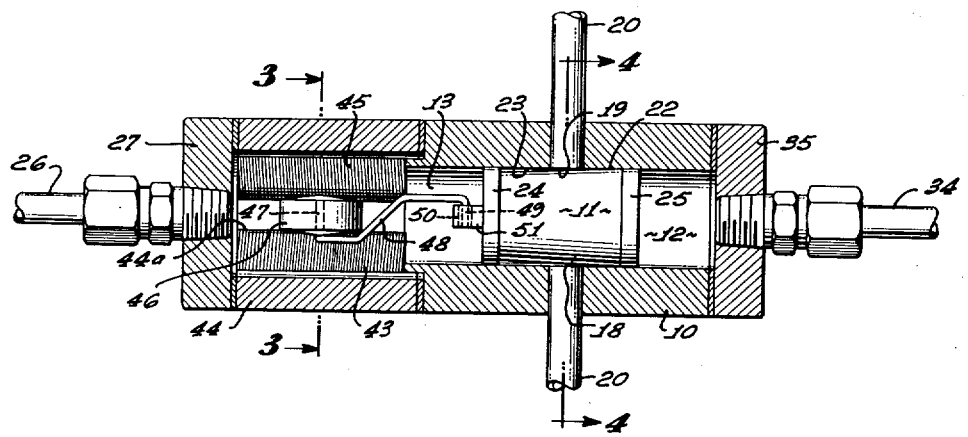
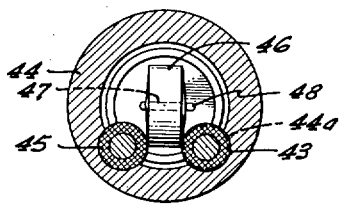
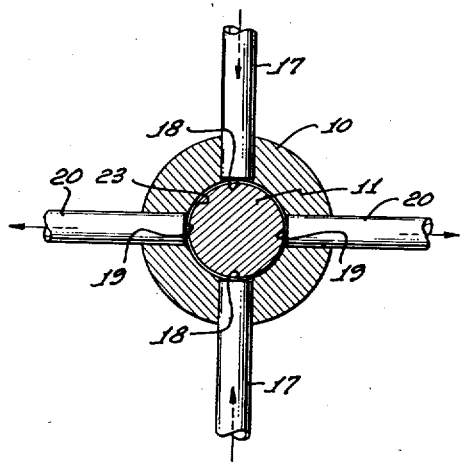
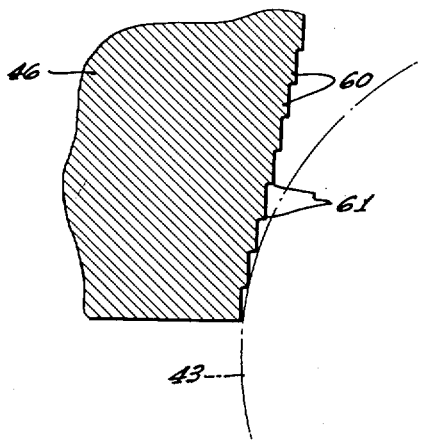
INVENTOR.
JAMES S. GASSAWAY
BY
Bernard Kriegel
ATTORNEY.

United States Patent Office 2,998,185
Patented Aug. 29, 1961

2,998,185
FLUID ACTUATED COMPUTER
James S. Gassaway, 2346 Glendon Ave.,
Los Angeles 46, Calif.
Filed Dec. 1, 1955, Ser. No. 550,437
17 Claims. (Cl. 235—61)

The present invention relates to apparatus for automatically computing, indicating, or controlling the relationship between a plurality of conditions in a system.

An object of the invention is to provide an improved fluid actuated computer capable of calculating and indicating accurately the relationship between two variable factors. In a more limited sense, the computer is particularly adaptable for dividing one variable by another and indicating the quotient accurately.

Another object of the invention is to provide a fluid actuated computer capable of calculating and indicating accurately the relationship between two variable factors, in which leakage of fluid in the computer has no effect on its accuracy.

A further object of the invention is to provide a fluid actuated computer capable of accurate calculation and indication independently of the physical characteristics of the fluid in the computer. Variations in the state of the fluid, such as in its vscosity and temperature, and in barometric pressure, are automatically compensated for in the computer and do not affect the accuracy of its determinations.

An additional object of the invention is to provide a fluid actuated computer that is simple in construction and mode of operation, while possessing a high degree of accuracy, and which can be manufactured at comparatively low cost.

Yet another object of the invention is to provide a fluid actuated computer apparatus capable of giving its indications through electrical instrumentalities embodying a variable resistor, in which the movable contact member of the resistor is easily shiftable along the resistance while maintaining excellent contact therewith.

Still a further object of the invention is to provide an improved apparatus capable of automatically calculating and indicating the instantaneous fuel consumption of a motor vehicle in miles per gallon, or in other suitable units, with a high degree of accuracy.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 2 is an enlarged longitudinal section through the computer itself;

FIG. 3 is a cross-section taken along the line 3—3 on FIG. 2;

FIG. 4 is a cross-section taken along the line 4—4 on FIG. 2;

FIG. 5 is a fragmentary enlarged section illustrating the contact relation between the rheostat contact wheel and its companion resistance coil or bus bar.

Figure 1:
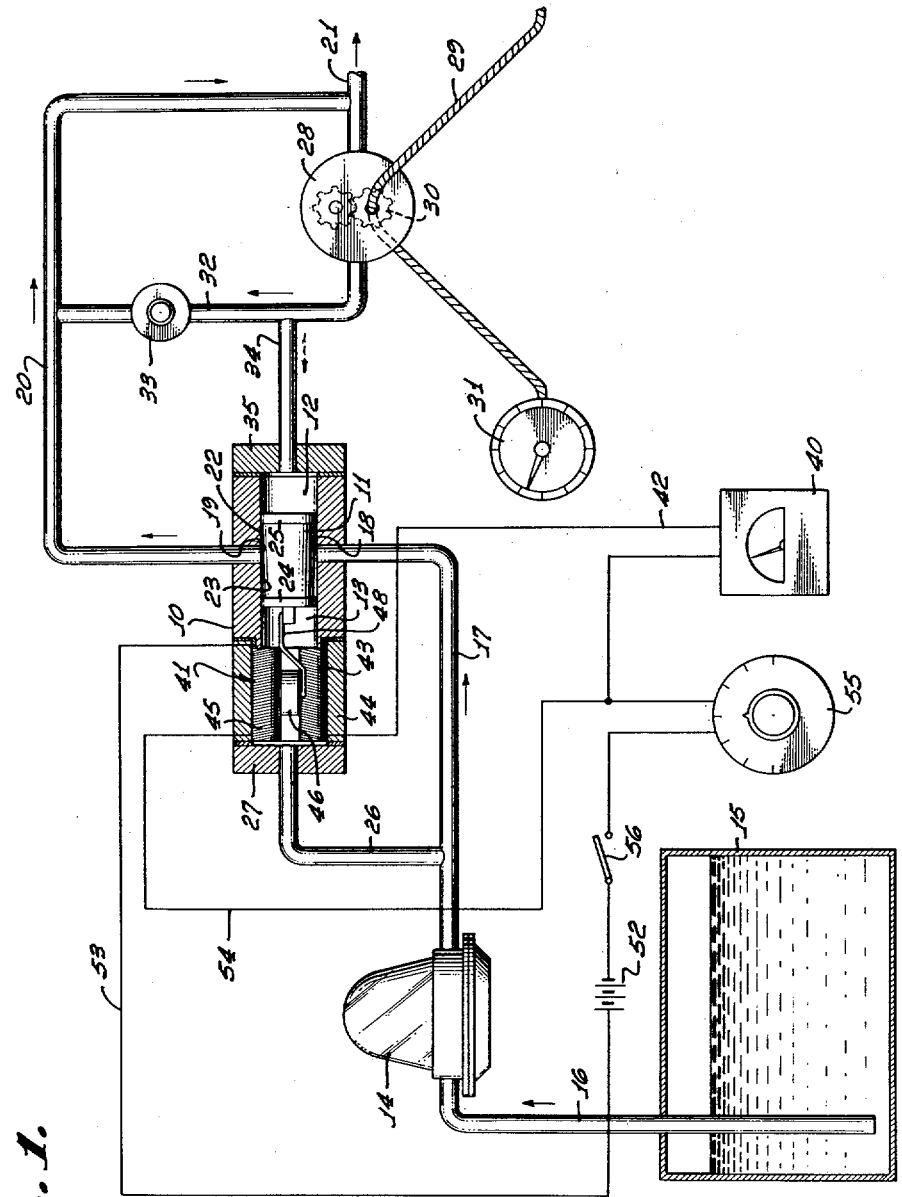
FIGURE 1 is a diagrammatic view of a computer and indicator system embodying the invention.

The specific computer and indicator arrangement disclosed in the drawings is designed to give an instantaneous reading of fuel consumption in a motor vehicle in terms of miles per gallon, or other suitable units, such as kilometers per liter, or the like. However, it is to be understood that in its broader aspects the specific use described herein of the invention is for purposes of illustration only, the computer being useful for other purposes, several examples of which are given hereinbelow.

The computer includes a cylinder 10 having a floating piston 11 movable axially therein. This piston divides the cylinder into a dividend pressure chamber 12 at one end thereof and a divisor pressure chamber 13 at the other end thereof. In the specific illustration given in the drawings, the fluid pressure in the dividend pressure chamber 12 corresponds to the rate of speed of the motor vehicle, whereas the fluid pressure in the divisor pressure chamber 13 corresponds to the rate of flow of fuel to the engine carburetor or fuel injector (not shown) of the motor vehicle.

The fluid pressure to the divisor pressure chamber 13 is supplied by a suitable liquid pump 14, which can be the fuel pump of the engine. This pump draws fuel from a suitable fuel tank 15 through a suction line 16, and discharges it into a discharge line 17, which is connected to a suitable inlet port 18 opening laterally into the cylinder 10 between the ends of the floating piston 11. The fuel can flow around the piston to a lateral outlet port 19 in the cylinder, continuing on through a fuel line 20 to a line 21 running to the carburetor of the motor vehicle.

It is to be noted that the central portion of the floating piston 11 has a periphery 22 of generally frusto-conical shape providing a variable clearance space with the wall 23 of the cylinder, whereas the end portions or heads 24, 25 of the piston make a sliding fit with the cylinder wall 23. The floating piston 11 provides a variable orifice with respect to the inlet port 18 of the discharge line 17 and the outlet port 19, causing a pressure differential to be present in the line 17 with respect to line 20 for action upon the piston 11 at the divisor pressure chamber 13. The pressure differential is conducted into the divisor pressure chamber through a first static pressure line 26, which branches from the discharge line 17 and extends to a cylinder head 27 at one end of the cylinder. Thus, the pressure in the discharge line 17 is applied to the liquid or fuel in the divisor pressure chamber 13, this pressure consisting of static pressure only. It acts on the piston 11 and tends to move it in one direction, as to the right, as disclosed in FIGS. 1 and 2 of the drawings.

The pressure in the dividend pressure chamber 12 is supplied by a liquid pump 28 of the positive displacement type, such as a gear pump, which is rotated in conformance with the speed of the motor vehicle. Thus, the flexible drive shaft 29 that ordinarily runs to the vehicle speedometer is connected to one of the gears 30 of the gear pump, to rotate the same in accordance with the speed of the vehicle. This flexible shaft may also be connected to the usual speedometer or tachometer 31 of the vehicle to indicate its rate of speed, usually in miles per hour. The positive displacement of gear pump 28 draws its fluid or liquid from the line 21 running to the carburetor, and discharges such fuel or liquid into a discharge line 32 which is connected to the fuel line 20 running from the lateral outlet of the cylinder. An adjustable orifice needle valve 33 is interposed in the pump discharge line 32, this needle valve being adjusted to throttle the flow of fluid from the positive displacement pump 28, causing a back pressure or pressure differential to be built up in the discharge line 32 relative to the pressure in line 20. This back pressure is transmitted to the liquid in the dividend pressure chamber 12 through a second static back pressure line 34, which extends into a cylinder head 35 on the dividend pressure chamber side of the cylinder 10, and which is connected to the pump discharge line 32 between the pump 28 and the needle valve 33, preferably at right angles to the discharge line. Thus, the back pressure in the discharge line 32 will be transmitted through the liquid in the second static back pressure line 34 to the liquid in the dividend pressure chamber 12 at the right end of the piston 11, as seen in FIGS. 1 and 2, tending to urge the piston to the left, or in the direction opposite to that in which the pressure from the liquid pump is tending to shift the piston.

As was stated above, the piston between its heads 24, 25 has an external frusto-conical or tapered surface 22, this surface tapering in a direction toward the divisor pressure chamber 13. The piston throttles the flow of fluid discharging into the cylinder from the inlet 18, the extent of throttling increasing as the piston moves toward the divisor pressure chamber 13, inasmuch as the effective clearance space between the piston and cylinder at the inlet 18 and outlet 19 is thereby decreased. The effective throttle or orifice opening increases as the piston 11 is moved in the opposite direction toward the dividend pressure chamber 12 of the cylinder. In other words, as the floating piston 11 moves to the right, as seen in the drawings, the pressure differential for a given rate of flow of fluid in the discharge line 17 will be decreased, whereas the movement of the piston in the opposite direction, or to the left, will decrease the effective orifice area and will result in a greater pressure differential in the discharge line 17 for a given volumetric rate of flow of liquid therethrough. The static pressure in the discharge line will, of course, be transferred to the first pressure line 26 and into the divisor pressure chamber 13, the velocity or movement of the fluid through the discharge line 17 having no effect on this pressure, inasmuch as the static pressure line 26 communicates with the discharge line 17 at right angles thereto. Not only will the velocity of the fluid in the discharge line 17 have no effect on the liquid in the pressure line 26, but the latter is also not subjected to the kinetic energy of the fluid flowing in the discharge line 17. For the same reasons, the movement of fluid through the discharge line 32 of the positive displacement gear pump 28 does not have any effect on the fluid in the second static pressure line 34, in view of the right angular relationship between the two. The velocity of the fluid in the discharge line 32 and the kinetic energy of such fluid do not affect the pressure in the second static pressure line 34, so that the latter truly represents the static pressure of the fluid in the discharge line 32.

In the operation of the apparatus so far described, the positive displacement gear pump 28 is providing a pressure differential or pressure drop in the second static pressure line 34 that corresponds to the speed of the motor vehicle. That is to say, the greater the speed, the greater will be the back pressure in the discharge line 32 and in the second static pressure line 34, this pressure being imposed on the liquid in the dividend pressure chamber 12 and tending to urge the floating piston 11 toward the left. For the same reasons, the greater the rate of flow of liquid from the liquid pump 14, the greater will be the pressure differential or pressure drop in the discharge line 17 and in the first static back pressure line 26, this pressure being transmited to the liquid in the divisor pressure chamber 13 and acting on the piston 11, tending to shift it to the right, or against the pressure action of the liquid in the dividend pressure chamber 12. For a given rate of speed, the liquid in the dividend pressure chamber 12 will have a certain static pressure. If this static pressure is greater than the static pressure in the divisor pressure chamber 13, then the piston will move to the left, which will decrease the effective area of the orifice between the lateral inlet 18 and lateral outlet 19 of the cylinder. The decrease in this orifice area will cause the pressure drop in the discharge line 17 and in the first pressure line 26, as well as in the divisor pressure cylinder 13, to increase until the piston has moved to the left sufficiently to equalize the divisor chamber pressure drop with the dividend chamber pressure drop, whereupon the floating piston 11 will come to rest.

On the other hand, assuming a constant speed of the vehicle, if the fuel supplied by the liquid pump 14 and flowing through the line 20 increases, the pressure differential in the discharge line 17, first static pressure line 26, and the divisor pressure chamber 13 will also increase, this pressure then being greater than the pressure in the dividend chamber 12, whereupon the piston 11 will move to the right. However, in view of the taper of the piston periphery 22, such movement to the right will increase the effective area of the orifice between the lateral inlet 18, and outlet 19, which increase in area will cause the pressure drop through the inlet 18 and outlet 19 to decrease, which is equivalent to a decrease in the pressure differential in the discharge line 17, first static pressure line 26, and divisor pressure chamber 13, the piston moving to the right to the point at which the pressures in both chambers 12 and 13 are equal.

The position of the floating piston 11 at any instant will provide a quotient, which will be equal to the speed of the vehicle in any particular unit, such as miles per hour, divided by the rate of flow of the fuel to the carburetor, such as in gallons per hour; the quotient then being expressed in miles per gallon. If the cylinder 10 were made of transparent material, the position of the floating piston 11 would give a direct reading of the fuel consumption in miles per gallon at any instant, the cylinder, of course, being provided with suitable indications.

It is to be noted that the same liquid is used to provide the pressure differential in the divisor pressure chamber 13 as is provided in the dividend pressure chamber 12, which, in the present instance, is the fuel being pumped to the carburetor. The use of the same fluid or liquid provides a liquid computing apparatus that is very accurate, and in which variations in the characteristics of the liquid are automatically compensated for, so that such variations do not introduce any errors into the computations effected automatically by the computer. This fact can be readily demonstrated.

The rate of fluid or liquid flowing through the discharge line 17 of the liquid pump 14 may be represented by the following formula:

$$Q_a = C_a A_a \sqrt{H_a}$$

wherein:

$Q_a$ = rate of flow of the liquid in the discharge line 17;

$C_a$ = a constant, which takes into consideration various factors, such as friction in the system, turbulence and eddying of the liquid, its viscosity, and the like;

$A_a$ = total equivalent passage area through which the liquid is flowing at any instant of time, which will be the effective area of the orifice between the inlet 18 and outlet 19 plus leakage area by the piston head 24;

$H_a$ = the static pressure differential in the discharge line 17 and the line 26, or the pressure drop across the orifice between the lateral inlet 18 and outlet 19;

The formula for the liquid flowing in the discharge line 32 of the positive displacement pump, operated in accordance with the speed of the vehicle, is represented in the same manner as:

$$Q_b = C_b A_b \sqrt{H_b}$$

wherein:

$Q_b$ = the rate of flow of the liquid in the discharge line 32;

$C_b$ = a constant, which takes into consideration various factors, such as friction in the system, turbulence and eddying of the liquid, its viscosity, and the like;

$A_b$ = the total equivalent passage area through which the liquid is flowing at any instant, which will be the passage area through the orifice needle valve 33 plus leakage area by the piston head 25;

$H_b$ = the static back pressure or pressure differential in the discharge line 32 and the line 34, or the pressure drop across the orifice needle valve 33.

Since the rate of flow of the liquid in the discharge line 32 corresponds to the speed of the vehicle, to secure the fuel consumption at any instant of time, one would divide $Q_b$ by $Q_a$. In other words, $$\frac{Q_b}{Q_a} = \frac{C_b A_b \sqrt{H_b}}{C_a A_a \sqrt{H_a}}$$

Since the same liquid is being used in connection with both pumps, the ratio of the constants $C_b$ and $C_a$ will remain the same despite variations in the physical characteristics of the liquid and can be expressed by a constant $C_c$. It is evident that for the piston to come to rest, the pressure differentials in the lines 26 and 34 must also be equal. That is to say, $H_b$ must equal $H_a$. Inasmuch as these two factors are equal, they will cancel out in the above ratio. Accordingly, it is apparent that $$\frac{Q_b}{Q_a} = \frac{C_b A_b}{C_a A_a} \text{ or } \frac{Q_b}{Q_a} = C_c \frac{A_b}{A_a}$$

The adjustable orifice needle valve 33 remains at a constant setting for any calibration of the system, which means that the area $A_b$ will equal a constant. Because of this fact, there can be only one area of $A_a$, which is the equivalent passage area between the inlet 18 and outlet 19, for any one ratio of $Q_b$ divided by $Q_a$. There can only be one piston position for any single area of $A_a$. Accordingly where the piston 11 comes to rest gives the ratio of $Q_b$ divided by $Q_a$, or the fuel consumption in any particular unit, such as miles per gallon.

It will be noted that there are no sealing rings, or the like, between the piston heads 24, 25 and the wall 23 of the cylinder. Preferably, these heads make a fairly close sliding fit with the cylinder. However, some relatively minute leakage will occur from the pressure chambers 12, 13 around the piston heads 25, 24, this fluid then passing into the fuel line 20. With regard to the discharge line running from the fuel pump, leakage past the piston head 24 merely means that there is that much less fuel flowing through the variable orifice at the lateral inlet 18. The fact that less fuel is flowing through the lateral inlet will mean that there is a lesser pressure differential in the discharge line 17, so that the floating piston would move to the left slightly.

By the same token, leakage of fluid around the other piston head 25 from the dividend pressure chamber 12 would tend to effect a decrease in the back pressure or pressure differential in the discharge line 32, the piston 11 shifting to the left slightly. However, the factors of leakage have no effect on the accuracy of the system since they can be compensated for merely by adjusting the orifice needle valve 33. Actually, the leakage area around each piston head 24, 25 is very small and is a constant value, making it easy to compensate for in calibrating the system merely by suitable setting of the orifice needle valve 33. Moreover, since the leakage area around each head is a constant value, leakage will not affect the operation of the system. The "$A_b$" of the above equation will still be a constant, since it is merely the sum of the area through the needle valve 33 and the leakage area around the piston head 25. The "$A_a$" of the above equation will still vary in proportion to the movement of the piston 11 in the cylinder, since the leakage area around the head 24 is a constant value. For that matter, even if the leakage areas were large, instead of small (which is preferred), such areas would be constant.

Accordingly, it is evident that the passage area $A_a$ through which liquid is flowing from the discharge side of the liquid pump 14 to the carburetor will vary in accordance with the ratio between the rate of flow of fluid through the discharge line 32 of the positive displacement pump 28 and the rate of flow of fluid through the discharge line 17 to the carburetor of the vehicle. This variation in area corresponds to the positions of the piston 11.

From a consideration of the aforementioned ratio of $Q_b$ to $Q_a$, the only variable to the securing of the quotient, such as miles per gallon, is the minimum equivalent passage area $A_a$ at the variable orifice between the inlet 18 and outlet 19 provided by the tapered surface 22 of the floating piston 11.

This is due to the use of the same liquids in both pressure chambers 12, 13, which causes the ratio $C_c$ of the constants $C_b$ to $C_a$ to remain the same. Accordingly, such factors as friction of the liquid, its viscosity, and Reynolds Number are automatically compensated for, since a change in the characteristics of the liquid flowing through the piston and cylinder orifice at the inlet 18 is the same change as occurs in the liquid flowing through the adjustable orifice needle valve 33. Thus, the system automatically compensates for variations in the characteristics of the liquid, which variations might also be due to temperature of the liquid and barometric pressure.

As specifically disclosed in the drawings, the quotient, or the indication at any instant of the miles per gallon, is being supplied at a point remote from the floating piston 11. A voltage meter 40 is provided to give the proper indication, this meter being calibrated to read the quotient of the rate of liquid flowing in the discharge line 32 of the positive displacement pump divided by the rate of liquid flowing through the line 21 to the carburetor.

The meter 40 is connected across a variable resistor 41. Thus, one line 42 leading from the voltmeter runs to a bus bar 43 mounted in an electrical pick-up housing 44 clamped in leakproof relation between the cylinder 10 and the cylinder head 27. This bus bar 43 is preferably generally cylindrical in shape and has a sharp edged helical thread 44a formed on its periphery.

Extending parallel to the bus bar 43, in spaced relation thereto, is a resistor 45, its conductive wire being wound in helical fashion, and such wire preferably being round or sharp edged. A rotary conductive contact wheel 46 is adapted to roll simultaneously upon the resistor 45 and the bus bar 43, this contact wheel transmitting the current between these two members. The contact wheel 46 is rollable about an axis at right angles to the resistor and bus bar, or along a path parallel thereto. Thus, the contact roller is rotatable upon a suitable bearing supporting pin 47 formed at one end of an arm 48, the other end of which terminates in a pivot pin 49 extending through a suitable insulated bushing 50 carried in a lug or ear 51 secured to the floating piston 11. As the piston 11 moves axially in the cylinder 10, its motion will be transmitted through the arm 48 to the wheel 46, the wheel rolling along the resistance coil 45 and the bus bar 43.

Current for operating the voltmeter 40 is supplied by a suitable battery 52, one end of the battery being connected by a suitable lead 53 to one end of the resistor 45. The other end of the resistor is connected by a suitable lead 54 to the other side of the voltmeter, and also to a rheostat 55, which is connected to the other side of the battery 52 through a suitable switch 56.

When the switch 56 is closed, the battery 52 will supply current to the resistor 45, the battery actually being connected directly across the ends of the resistor. The rheostat 55 is provided to enable compensations to be made for variation in the voltage supplied by the battery, in order that an accurate reading will be secured on the computer voltage meter 40. The voltage meter itself measures the voltage drop between one end of the resistor and the point of contact of the rotary wheel 46 therewith, inasmuch as the rotary wheel is in constant contact with the bus bar 43.

As shown in FIG. 1, if the piston 11 is disposed to the left in its cylinder 10, the wheel 46 will be contacting the resistor near its left end, and there will be a relatively small voltage drop across the resistor 45, as measured by the voltage meter. Accordingly, the meter will read a minimum value, which is indicative of the fact that fuel consumption is very low in view of the fact that the miles per gallon is very high. As the piston 11 moves to the right, as the fuel pumped to the carburetor increases in proportion to the speed of the vehicle, the contact roller 46 is moved along the wound resistor, the voltage drop between one end of the resistor and the position of the contact roller increasing, and there being a corresponding increase in the reading on the voltage meter 40 of the miles per gallon or, in general, of the quotient between the rate of liquid flowing through the line 21 to the carburetor and the rate of liquid flow in the discharge line 32 from the positive displacement pump 28.

The voltmeter 40 provides a reading corresponding to the position of the floating piston 11, and will do so in a very accurate fashion. The accuracy of the reading is enhanced, in the present instance, by minimizing the resistance to axial movement of the floating piston 11 by the contact wheel 46, while insuring a good electric contact between the wheel, on the one hand, and the wound resistor 45 and the bus bar 43, on the other hand. Such good contact is secured merely by the weight of the wheel 46 and the arm 48 secured thereto, gravity holding the wheel in engagement with the resistor and the bus bar. The wheel and arm are relatively light, and, therefore, do not offer any material resistance to axial movement of the piston 11 under the influence of the liquid pressures in the two pressure chambers 12, 13. Despite the factor of lightness, a good contact is secured between the wheel 46 and the resistor and bus bar by maximizing the unit pressure between the wheel and the other two members. To secure a high unit of contact force, the sides of the wheel 46 are tapered and are formed with concentric steps 60, which are shown in exaggerated fashion in FIG. 5. As an example, each step may be about 1/1000-inch in width across its face and about 1/100-inch larger in diameter than the preceding step, thereby forming circular edges 61 radially and axially spaced from each other. For any position of the wheel 46 along the resistor 45 and the bus bar 43, a side edge 61 on one face of the wheel will engage one of the sharp edged circumferential threads 44a of the bus bar, forming, in effect, a point contact therebetween. A side edge 61 on the other face of the wheel will, at the same time, engage one of the sharp edges or a round wire portion of the resistor 45, also forming a point contact therewith. In effect, the wheel will be engaging the resistance wire and a thread on the bus bar simultaneously at only two points, which will provide a high unit pressure between the wheel 46, on the one hand, and the bus bar 43 and the resistor 45, on the other hand, despite the relatively light weight of the contact wheel and the arm on which it is mounted. Assurance is, therefore, had of a good electric contact between the wheel and the resistor and bus bar, which will correspondingly insure accuracy in the reading of the quotient or voltage meter 40.

It is to be noted that the fluid from the discharge line 17 of the liquid pump 14 flows into the lateral cylinder inlet 18 and flows across the piston 11. Such cross flow minimizes errors in the system, since the kinetic energy in the fluid passing into the cylinder 10 is not tending to shift the floating piston 11 axially. The floating piston is shifted simply as a result of the static pressure in the divisor chamber 13 and the dividend chamber 12.

As shown in FIG. 4, to afford further accuracy and freedom of movement of the floating piston 11, the discharge line may branch into two diametrically opposed inlets 18 opening laterally into the cylinder, there being two diametrically opposed outlets 19 connected to the fuel line 20, which are displaced ninety degrees from the inlets 18. With this arrangement, the fluid flowing into the chamber acts on the piston 11 in diametrically opposite directions, and does not tend to force the piston against the side of the cylinder. Similarly, the fluid flowing from the cylinder does not tend to reactively force the piston against one side of the cylinder, in view of the balanced condition that is provided by disposing the outlets 19 diametrically opposite one another.

It is, therefore, apparent that the piston is not susceptible to any forces of moving liquid tending to shift the piston axially or tending to force it against the cylinder wall 23, which might entail some frictional resistance to axial movement of the piston in the cylinder.

The computer device has many uses in addition to determining the rate of fuel consumption of a vehicle. It is capable of accurately providing the quotient of different variable factors from the ones specifically indicated. As an example, the positive displacement pump 28 can operate in response to the rate of other factors, such as the feeding of material that is to have a coating applied thereto, the rate of flow of the coating material producing an operation of another mechanism which will force a suitable fluid or liquid through the discharge line 17 into the cylinder, and out of the cylinder through the other line 20, the pressure of this fluid being applied to the divisor pressure chamber 13 through the branch duct 26. In fact, the piston 11 may be used to control the thickness of the coating provided on the material, maintaining a proper ratio between the rate of movement of the material and the volumetric rate of the coating applied thereto. The computer can be used for the control of proportioning of liquids. Thus, the rate of flow of one liquid will have an effect on the back pressure or pressure differential in the dividend pressure chamber 12, whereas the rate of flow of the other liquid will have an effect on the pressure differential in the divisor pressure chamber 13.

In general, the apparatus specifically disclosed can compute the relationship between two variables, and can indicate such relationship, or can be used for regulating and controlling such relationship.

The inventor claims:

1. In fluid operated computer apparatus: cylinder means; piston means movable in said cylinder means and separating said cylinder means into a pair of pressure chambers; means providing a first fluid under pressure flowing at a rate corresponding to a first particular factor and for directing the static pressure only of said fluid to one of said chambers to urge said piston means in one direction; means providing a second fluid under pressure flowing at a rate corresponding to a second particular factor and for directing the static pressure only of said second fluid to the other of said chambers to urge said piston means in the opposite direction; means including said piston means providing a variable orifice through which one of said fluids passes, the effective area of said orifice varying in response to movement of said piston means in said cylinder means.

2. In fluid operated computer apparatus: cylinder means; piston means movable in said cylinder means and separating said cylinder means into a pair of pressure chambers; means providing a first fluid under pressure flowing at a rate corresponding to a first particular factor and for directing the static pressure only of said fluid to one of said chambers, to urge said piston means in one direction; means providing a second fluid under pressure flowing through said cylinder means at a rate corresponding to a second particular factor and for directing the static pressure only of said second fluid to the other of said chambers to urge said piston means in the opposite direction; said piston means and cylinder means providing a variable orifice through which said second fluid flows, the effective area of said orifice varying in response to movement of said piston means in said cylinder means to automatically vary the static pressure differential in said other of said chambers.

3. In fluid operated computer apparatus: cylinder means; piston means movable in said cylinder means and separating said cylinder means into a pair of pressure chambers; means providing a first fluid under pressure flowing at a rate corresponding to a first particular factor and for directing the static pressure only of said fluid to one of said chambers to urge said piston means in one direction; means providing a second fluid under pressure flowing into said cylinder means and laterally across said piston means at a rate corresponding to a second particular factor and for directing the static pressure only of said second fluid to the other of said chambers to urge said piston means in the opposite direction; said piston means and cylinder means providing a variable orifice through which said second fluid flows, the effective area of said orifice varying in response to movement of said piston means in said cylinder means to automatically vary the static pressure differential in said other of said chambers.

4. In fluid operated computer apparatus: cylinder means; piston means movable in said cylinder means and separating said cylinder means into a pair of pressure chambers; means providing a first fluid under pressure flowing at a rate corresponding to a first particular factor and for directing the static pressure only of said fluid of one of said chambers to urge said piston means in one direction; means providing a second fluid under pressure flowing into said cylinder means and laterally across said piston means at a rate corresponding to a second particular factor and for directing the static pressure only of said second fluid to the other of said chambers to urge said piston means in the opposite direction; said piston means having a tapered portion coacting with said cylinder means to provide a variable orifice through which said second fluid flows, the effective area of said orifice varying in response to movement of said piston means in said cylinder means to automatically vary the static pressure differential in said other of said chambers.

5. In fluid operated computer apparatus: cylinder means; piston means movable in said cylinder means and separating said cylinder means into a pair of pressure chambers; means providing a first conduit through which a first fluid under pressure is adapted to flow at a rate corresponding to a first particular factor; a branch duct intersecting said first conduit at right angles for transmitting the static pressure only of said first fluid to one of said pressure chambers to urge said piston means in one direction; means providing a second conduit through which a second fluid under pressure is adapted to flow at a rate corresponding to a second particular factor; a branch duct intersecting said second conduit at right angles for transmitting the static pressure only of such second fluid to the other of said pressure chambers to urge said piston means in the opposite direction; means including said piston means providing a variable orifice through which one of said fluids passes, the effective area of said orifice varying in response to movement of said piston means in said cylinder means.

6. In fluid operated computer apparatus: cylinder means; piston means movable in said cylinder means and separating said cylinder means into a pair of pressure chambers; means providing a first conduit through which a first fluid under pressure is adapted to flow at a rate corresponding to a first particular factor; a branch duct intersecting said first conduit at right angles for transmitting the static pressure only of said first fluid to one of said pressure chambers to urge said piston means in one direction; means providing a second conduit through which a second fluid under pressure can flow into said cylinder means and laterally across said piston means at a rate corresponding to a second particular factor; a branch duct intersecting said second conduit at right angles for transmitting the static pressure only of such second fluid to the other of said pressure chambers to urge said piston means in the opposite direction; said piston means having a tapered portion coacting with said cylinder means to provide a variable orifice through which said second fluid flows, the effective area of said orifice varying in response to movement of said piston means in said cylinder means to automatically vary the pressure differential in said other of said chambers.

7. In fluid operated computer apparatus as defined in claim 1; wherein said first and second fluids are substantially entirely alike.

8. In fluid operated computer apparatus as defined in claim 6; wherein said first and second fluids are substantially entirely alike; and means for directing the fluid in one of said conduits to the other of said conduits.

9. In fluid operated computer apparatus: cylinder means; piston means movable in said cylinder means and separating said cylinder means into a pair of pressure chambers; means providing a first fluid under pressure flowing at a rate corresponding to a first particular factor and for directing the static pressure only of said fluid to one of said chambers to urge said piston means in one direction; means providing a second fluid under pressure flowing at a rate corresponding to a second particular factor and for directing the static pressure only of said second fluid to the other of said chambers to urge said piston means in the opposite direction; means including said piston means providing a variable orifice through which one of said fluids passes, the effective area of said orifice varying in response to movement of said piston means in said cylinder means; and means for indicating the positions of said piston means in said cylinder means.

10. In fluid operated computer apparatus: a cylinder; a piston movable in said cylinder and separating said cylinder into a pair of pressure chambers; said cylinder having an inlet and an outlet; a first conduit connected to said inlet for conducting fluid under pressure into said cylinder; a second conduit connected to said outlet for conducting said fluid from said cylinder; means for transmitting the static pressure only of the fluid in said first conduit to one of said pressure chambers to urge said piston in one direction; a third conduit connected to said second conduit; means for transmitting fluid from said second conduit under pressure to said third conduit for return by said third conduit to said second conduit; means for transmitting the static pressure only of the fluid in said third conduit to the other of said pressure chambers to urge said piston in the opposite direction; means including said piston providing a variable orifice through which the fluid in said first conduit passes, the effective area of said orifice varying in response to movement of said piston in said cylinder.

11. In fluid operated computer apparatus: a cylinder; a piston movable in said cylinder and separating said cylinder into a pair of pressure chambers; said cylinder having an inlet and an outlet; a first conduit connected to said inlet for conducting fluid under pressure into said cylinder; a second conduit connected to said outlet for conducting said fluid from said cylinder; means for transmitting the static pressure only of the fluid in said first conduit to one of said pressure chambers to urge said piston in one direction; a third conduit connected to said second conduit; means for transmitting fluid from said second conduit under pressure to said third conduit for return by said third conduit to said second conduit; means for transmitting the static pressure only of the fluid in said third conduit to the other of said pressure chambers to urge said piston in the opposite direction; said piston having a tapered portion coacting with said cylinder to provide a variable orifice through which the fluid from said first conduit passes, the effective area of said orifice varying in response to movement of said piston in said cylinder to automatically vary the pressure differential in said first conduit and the static pressure differential in said one of said pressure chambers.

12. In fluid operated computer apparatus: a cylinder; a piston movable in said cylinder and separating said cylinder into a pair of pressure chambers; said cylinder having an inlet and an outlet; a first conduit connected to said inlet for conducting fluid under pressure into said cylinder; a second conduit connected to said outlet for conducting said fluid from said cylinder; a branch duct intersecting said first conduit at right angles for transmitting the static pressure only of said fluid to one of said pressure chambers to urge said piston in one direction; a third conduit connected to said second conduit; means for transmitting fluid from said second conduit under pressure to said third conduit for return by said third conduit to said second conduit; a branch duct intersecting said third conduit at right angles for transmitting the static pressure only of the fluid therein to the other of said pressure chambers to urge said piston in the opposite direction; said piston having a tapered portion coacting with said cylinder to provide a variable orifice through which said fluid from said first conduit flows, the effective area of said orifice varying in response to movement of said piston in said cylinder to automatically vary the pressure differential in said first conduct and the static pressure differential in said one of said pressure chambers.

13. In fluid operated computer apparatus: a cylinder; a piston movable in said cylinder and separating said cylinder into a pair of pressure chambers; said cylinder having an inlet and an outlet; a first conduit connected to said inlet for conducting fluid under pressure into said cylinder; a second conduit connected to said outlet for conducting said fluid from said cylinder; a branch duct intersecting said first conduit at right angles for transmitting the static pressure only of said fluid to one of said pressure chambers to urge said piston in one direction; a third conduit connected to said second conduit; means for transmitting fluid from said second conduit under pressure to said third conduit for return by said third conduit to said second conduit; a branch duct intersecting said third conduit at right angles for transmitting the static pressure only of the fluid therein to the other of said pressure chambers to urge said piston in the opposite direction; said piston having a tapered portion coacting with said cylinder to provide a variable orifice through which said fluid from said first conduit flows, the effective area of said orifice varying in response to movement of said piston in said cylinder to automatically vary the pressure differential in said first conduit and the static pressure in said one of said pressure chambers; and an adjustable orifice valve in said third conduit to vary the pressure differential therein and the static pressure differential in said other of said pressure chambers.

14. In a fluid operated quotient computer for indicating the ratio between the distance traveled by and fuel consumption of a vehicle: a cylinder; a piston movable in said cylinder and separating said cylinder into a dividend pressure chamber and a divisor pressure chamber; said cylinder having an inlet and an outlet; a first conduit connected to said inlet for conducting fuel into said cylinder; a second conduit connected to said outlet for conducting said fuel from said cylinder to an engine; means for transmitting the static pressure only of said fuel in said first conduit to said divisor chamber; a third conduit connected to said second conduit; a pump operable in response to the speed of the vehicle and drawing fuel from said second conduit and delivering said fuel under pressure to said third conduit; means for transmitting the static pressure only of fuel in said third conduit to said dividend pressure chamber; means including said piston providing a variable orifice through which the fuel in said first conduit passes, the effective area of said orifice varying in response to movement of said piston in said cylinder; and means for indicating the position of said piston in said cylinder.

15. In a fluid operated quotient computer for indicating the ratio between the distance travelled by and fuel consumption of a vehicle: a cylinder; a piston movable in said cylinder and separating said cylinder into a dividend pressure chamber and a divisor pressure chamber; said cylinder having an inlet and an outlet; a first conduit connected to said inlet for conducting fuel into said cylinder; a second conduit connected to said outlet for conducting said fuel from said cylinder to an engine; means for transmitting the static pressure only of said fuel in said first conduit to said divisor chamber; a third conduit connected to said second conduit; a pump operable in response to the speed of the vehicle and drawing fuel from said second conduit and delivering said fuel under pressure to said third conduit; means for transmitting the static pressure only of fuel in said third conduit to said dividend pressure chamber; said piston having a tapered portion coacting with said cylinder to provide a variable orifice through which the fuel from said first conduit passes, the effective area of said orifice varying in response to movement of said piston in said cylinder to automatically vary the static pressure differential in said divisor pressure chamber; and means for indicating the position of said piston in said cylinder.

16. In a fluid operated quotient computer for indicating the ratio between the distance travelled by and fuel consumption of a vehicle: a cylinder; a piston movable in said cylinder and separating said cylinder into a dividend pressure chamber and a divisor pressure chamber; said cylinder having an inlet and an outlet; a first conduit connected to said inlet for conducting fuel into said cylinder; a second conduit connected to said outlet for conducting said fuel from said cylinder to an engine; means for transmitting the static pressure only of said fuel in said first conduit to said divisor chamber; a third conduit connected to said second conduit; a pump operable in response to the speed of the vehicle and drawing fuel from said second conduit and delivering said fuel under pressure to said third conduit; means for transmitting the static pressure only of fuel in said third conduit to said dividend pressure chamber; means including said piston providing a variable orifice through which the fuel in said first conduit passes, the effective area of said orifice varying in response to movement of said piston in said cylinder; and means for indicating the position of said piston in said cylinder; said indicating means including an electric circuit comprising an electrically responsive meter, a helically wound resistor connected to said meter, a bus bar connected to said meter and having a helical thread formed on its periphery, and a contact wheel movable with said piston and having circular edges on its side faces simultaneously engaging said resistor and thread.

17. In fluid operated computer apparatus: cylinder means; piston means movable in said cylinder means and separating said cylinder means into a pair of pressure chambers; means providing a first fluid under pressure flowing at a rate corresponding to a first particular factor and for directing the static pressure only of said fluid to one of said chambers to urge said piston means in one direction; means providing a second fluid under pressure flowing at a rate corresponding to a second particular factor and for directing the static pressure only of said second fluid to the other of said chambers to urge said piston means in the opposite direction; means including said piston means providing a variable orifice through which one of said fluids passes, the effective area of said orifice varying in response to movement of said piston means in said cylinder means; and means for indicating the positions of said piston means in said cylinder means; said indicating means including an electric circuit comprising an electrically responsive meter, a helically wound resistor connected to said meter, a bus bar connected to said meter and having a helical thread formed on its periphery, and a contact wheel movable with said piston means and having circular edges on its side faces simultaneously engaging said resistor and thread.

References Cited in the file of this patent

UNITED STATES PATENTS

| | | |
|---|---|---|
| 1,492,358 | Christensen | Apr. 29, 1924 |
| 1,654,421 | Knerr | Dec. 27, 1927 |
| 1,747,536 | Van Lynden | Feb. 18, 1930 |

FOREIGN PATENTS

| | | |
|---|---|---|
| 423,974 | Germany | Jan. 18, 1926 |